United States Patent [19]

Isobe et al.

[11] Patent Number: 5,253,235
[45] Date of Patent: Oct. 12, 1993

[54] DISK PLAYER WHEREIN A PLURALITY OF COMPACT DISKS AND A LASER DISK ARE ROTATED WITH A SINGLE MOTOR

[75] Inventors: Nobuyuki Isobe; Shigeharu Furusawa; Masao Abe; Toshiyasu Iida; Kenjirou Ooizumi, all of Saitama, Japan

[73] Assignee: Pioneer Electronic Corporation, Tokyo, Japan

[21] Appl. No.: 769,696

[22] Filed: Oct. 2, 1991

[30] Foreign Application Priority Data

Feb. 26, 1991 [JP] Japan ................................ 3-030755

[51] Int. Cl.[5] .................... G11B 17/00; G11B 25/04
[52] U.S. Cl. ...................................... 369/37; 369/191; 360/98.06
[58] Field of Search .................. 369/36, 37, 75.2, 191, 369/39; 360/98.04, 98.06, 99.06

[56] References Cited

U.S. PATENT DOCUMENTS

| | | | |
|---|---|---|---|
| 4,755,978 | 7/1988 | Takizawa et al. | 369/37 |
| 4,773,057 | 9/1988 | Otsuka et al. | 369/75.2 |
| 4,796,251 | 1/1989 | Hirano | 369/75.2 |
| 5,022,020 | 6/1991 | Langman et al. | 369/37 |
| 5,043,963 | 8/1991 | Iwamoto | 369/36 |
| 5,115,419 | 5/1992 | Akiyama et al. | 369/37 |
| 5,146,451 | 9/1992 | Kang | 369/37 |

Primary Examiner—Edward P. Westin
Assistant Examiner—John R. Lee
Attorney, Agent, or Firm—Sughrue, Mion, Zinn, Macpeak & Seas

[57] ABSTRACT

Four compact disks (CDs) and one laser disk (LD) are placed in a tray having a plurality of disk receiving sections and moved through a disk supplying opening into a disk player housing. In accordance with the desired input to the disk player, a disk holder is directed to a desired disk receiving position via a swinging arm device which supports the disk holder and places the desired disk in the disk playing position.

3 Claims, 16 Drawing Sheets

DISK PLAYER WHEREIN A PLURALITY OF COMPACT DISKS AND A LASER DISK ARE ROTATED WITH A SINGLE MOTOR

FIELD OF THE INVENTION

This invention relates to a disk player for playing different types of optical disks which are placed on a tray having a plurality of disk receiving sections.

BACKGROUND OF THE INVENTION

In order to play a plurality of compact disks (CDs), it is necessary to replace them one after another. A so-called "compatible disk player" has been proposed in the art, to eliminate this troublesome operation, which can play a plurality of compact disks, or an optical video disk (LD), successively laid on a tray.

A compatible disk player of this type has been proposed in Japanese Utility Patent Application (OPI) No. 153345/1988 (the term "OPI" as used herein means an "unexamined published application"). A plurality of first disks (or CDs) and a second disk (or an LD), in the compatible disk player, are laid on a tray in the player body. A CD motor for rotating a CD and an LD motor for rotating an LD are provided in the player body. The LD is rotated by the LD motor when playing the LD on the tray. The desired CD is rotated by the CD motor when playing the CDs after the tray is turned so as to move the desired CD to the CD motor.

The conventional compatible disk player suffers from the following problems. It is essential for the compatible disk player to have one expensive precision motor to rotate CDs, and another expensive precision motor to rotate the LD. The tray must be turned so that the desired CD comes to the CD motor. Further, in order to mount an LD on the LD motor, it is necessary to incline the CD motor through a predetermined angle to prevent it from being brought into contact with the CD. This structure requires intricate construction. On the other hand, the LD cannot be played with the CDs laid on the tray, and the CDs must be removed from the tray in order to play the LD. Thus, the advantage that a plurality of CDs can be laid on the tray turns into a disadvantage in that the CDs obstruct the playing of the LD.

SUMMARY OF THE INVENTION

The object of this invention is to eliminate the above-described difficulties accompanying a conventional disk player. More specifically, an object of the invention is to provide a disk player in which it is unnecessary to turn the tray on which disks are laid.

Another object of the invention is to provide a disk player in which a plurality of first disks (CDs) and a second disk (LD) can be rotated with only one motor.

A further object of the invention is to provide a disk player in which an LD can be played with a plurality of CDs laid on the tray.

The foregoing objects of the invention have been achieved by the provision of a disk player which is constituted by the following elements: a tray having a plurality of disk receiving sections on which the first disks are laid in such a manner that the centers of the disk receiving sections are on one and the same circumference; and a disk holder for detachably holding the first disk; a swinging arm apparatus which is swung about a disk playing position while supporting the disk holder in such a manner that the disk holder is reciprocated between any one of the disk receiving sections and the disk playing position.

The disk player further comprises: a second guide for placing a second disk at the disk playing position; and, a first guide which is stepped beneath the second guide and adapted to place the first disk below the second disk.

The swinging arm apparatus turns about the disk playing position while reciprocating the disk holder between a selected disk receiving section for the first disks and the disk playing section. Therefore, the first disk placed in the selected disk receiving section on the tray is moved to the disk playing position by the disk holder, and after being played it is returned to the disk receiving section. Any one of the plurality of disk receiving sections can be selected by turning the swinging arm apparatus.

BRIEF DESCRIPTION OF THE DRAWINGS

FIG. 12 is a perspective view of the swinging arm body.

FIG. 13 is a perspective view of the motor holder.

FIG. 14 is an exploded perspective view of the carriage body and an outside cam.

FIG. 15 is a perspective view of the front slide rack.

FIG. 16 is a perspective view of the rear slide rack.

FIG. 17 is a perspective view of the stationary rack.

FIG. 18 is a perspective view of the front changeover lever.

FIG. 19 is a perspective view of the rear changeover lever.

DESCRIPTION OF THE PREFERRED EMBODIMENTS

A disk player, one preferred embodiment of the invention, will be described with reference to the accompanying drawings.

Figure 1:
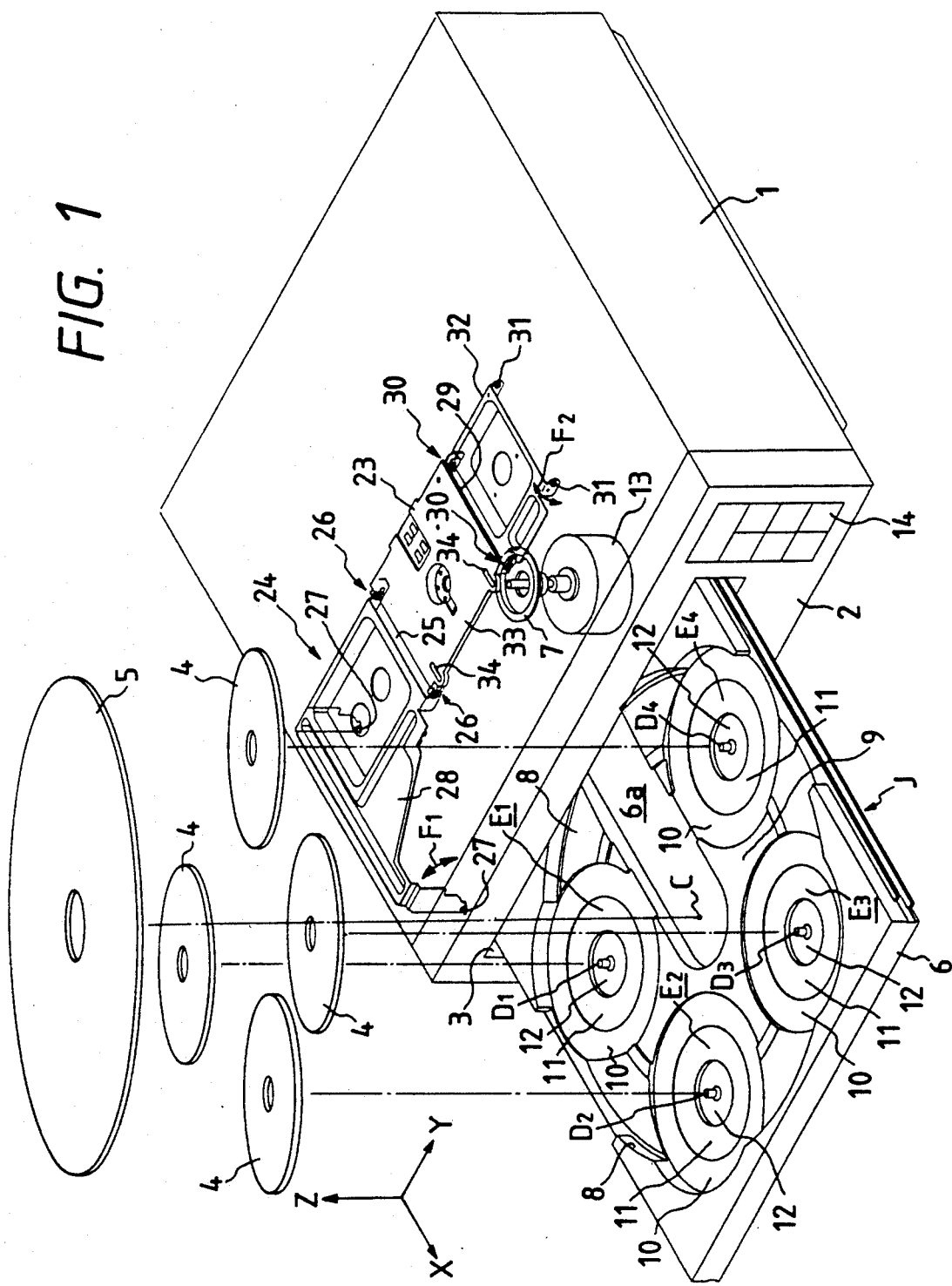
FIG. 1 is a perspective view of the disk player according to this invention with its tray at an ejecting position.
Figure 2:
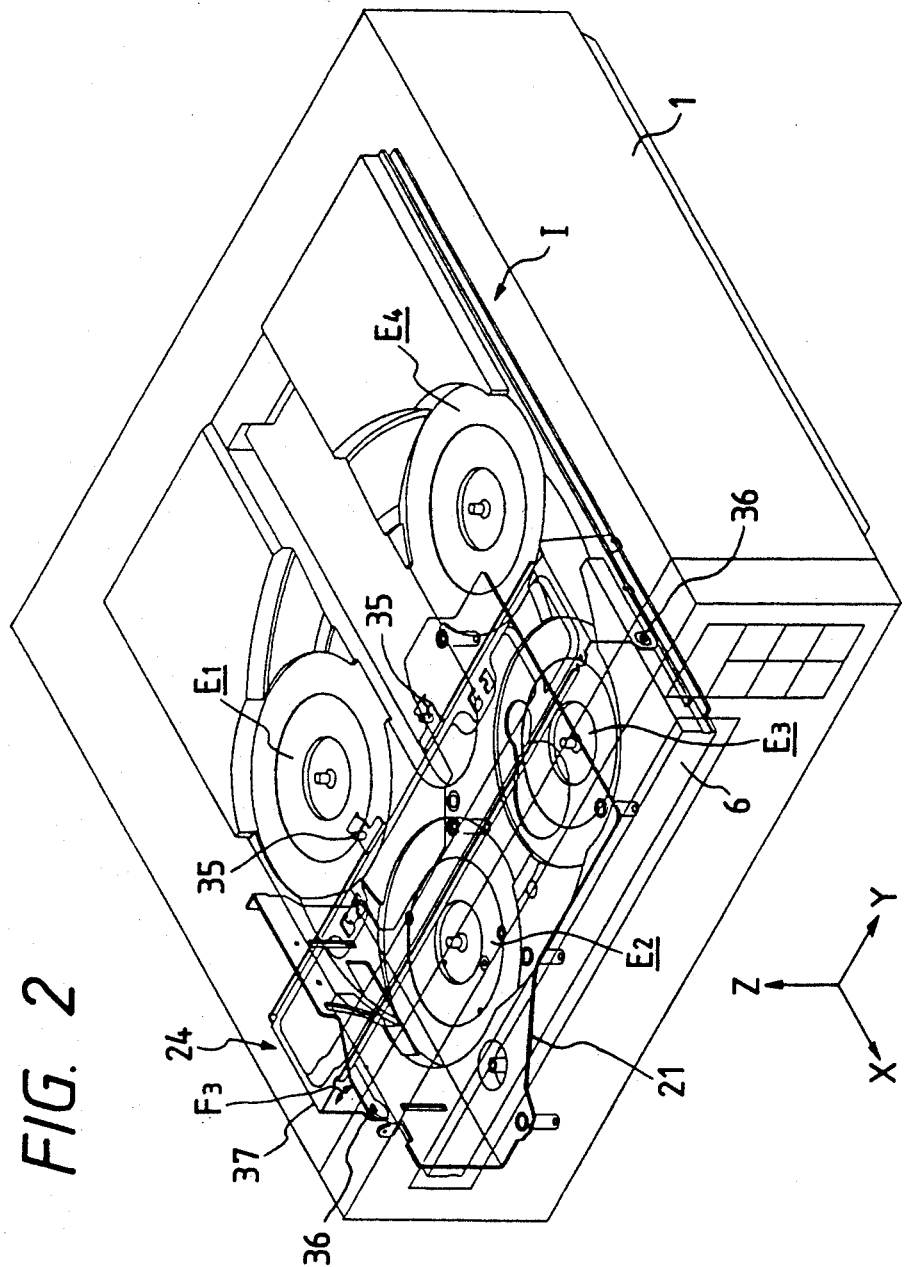
FIG. 2 is a perspective view of the disk player with the tray retracted into the player housing.

FIGS. 1–4 show the overall arrangement of the disk player according to the invention. As shown in FIGS. 1 and 2, a rectangular disk supplying opening 3 is formed in the front panel 2 of a player housing 1 in such a manner that it is elongated horizontally. Four first disks, the four compact disks (CDs) to be played, and one second disk, the one optical video disk (LD) 5 having a larger diameter than the first four disks, are detachably mounted on a tray 6. Tray 6 is moved through the disk supplying opening 3 to an ejecting position J (FIG. 1) outside the player housing 1 and moved through the opening 3 to an accommodating position I (FIG. 2) inside the player housing 1. The arrows X, Y and Z indicate a forward direction, a right direction, and an upward direction, respectively, in FIGS. 1 and 2. The CDs 4 are about 12 or 8 cm in diameter, and the LD 5 is about 30 or 20 cm in diameter; however, the disks, sizes are not limited thereto.

As shown in FIG. 1, tray 6 is arranged substantially parallel to the disk bearing surface of a turntable 7. Tray 6 has a plurality of disk receiving sections $E_1$, $E_2$, $E_3$ and $E_4$ which have their centers D, $D_z$, $D_3$ and $D_4$ on the circumference of a circle whose center is located at point C. Four CDs 4 are detachably mounted on the disk receiving sections. An LD 5 may be detachably mounted at the center C, within the confines of a second guide provided by recesses 8 and 9. A large diameter recess 8 is provided for a large diameter LD and a smaller diameter recess 9 is provided for a small diameter LD and are formed concentrically with each relative to center C.

Figure 14:
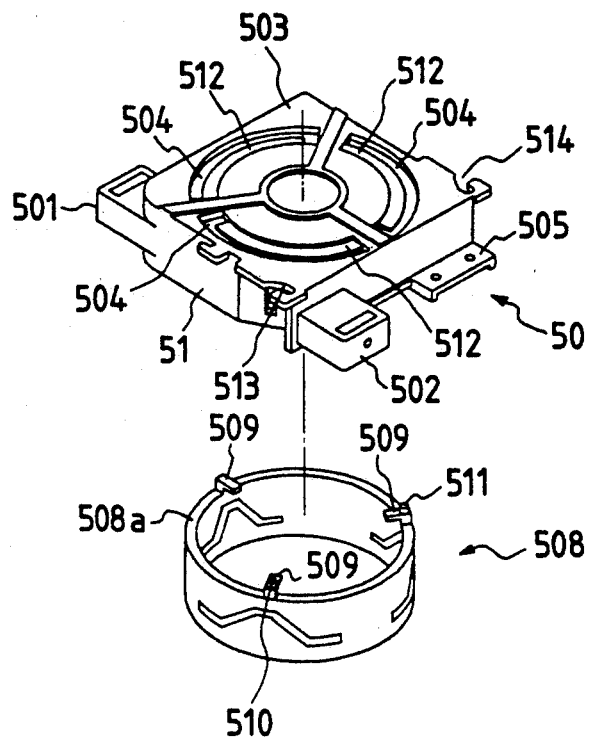

The second guide may be applied to the case where, instead of an LD, CDs are laid on the tray 6. The tray 6 has first guides, which are stepped from the second guide section, so as to detachably mount CDs 4 on the disk receiving sections $E_1$ through $E_4$. The first guide is used to lay the CDs 4 below the LD 5 at each of the disk receiving sections $E_1$ through $E_4$. The first guides are constituted by a large diameter recess 10 for a large diameter CD, a smaller diameter recess 11 for a small diameter CD, and a central recess 12 for receiving a CD holding pawl or a CD holder 522 (FIG. 14). These recesses 10, 11 and 12 are coaxial with respect to each other, with their centers at the center of the respective disk receiving section, and are stepped down from one another.

In FIG. 1, a cut 6a is provided in tray 6, to prevent tray 6 from being brought into contact with the turntable 7 and the spindle motor 13 when the tray 6 is moved back and forth. A group of switches 14 are provided on the front panel 2, to operate the disk player.

FIG. 2 shows tray 6 retracted into the player housing 2, and a structure for supporting the tray 6. Tray 6, being supported by a loading base 21 fixed in the player housing 1, is moved back and forth by a drive mechanism (not shown). Tray 6 is moved in the forward direction (as indicated by the arrow X) to the ejecting position J as shown in FIG. 1, or to the accommodating position I where the CDs 4 and LD 5 can be played.

A plate-shaped arm base 23 supporting a disk clamper 22, as shown in FIG. 1, which is adapted to clamp the disk (CD 4 or LD 5), is arranged parallel to tray 6. The arm base 23 is moved vertically by an arm base lifting mechanism 24 (FIG. 2). The arm base lifting mechanism 24 is constituted by a left clamper arm 28 which is engaged with the left side 25 of the arm base 23 through left engaging pieces 26 and, as indicated by the arrow $F_1$, further is engaged with the loading base 21 (FIG. 2) through axial pieces 27; a right clamper arm 32 which is engaged with the right side 29 of the arm base 23 through right engaging pieces 30 and, as indicated by the arrow $F_2$, is engaged with the loading base 21 (FIG. 2) through axial pieces 31; and, a front clamper arm 37 (FIG. 2), which is engaged with the arm base 23 through protrusions 35 (FIG. 2) which are engaged with a pair of elongated through-holes 34 formed in the front end portion 33 of the arm base 23 in such a manner as to allow the relative movement of the protrusions 35 (FIG. 2) and the elongated through-holes, and, as indicated by the arrow $F_3$ in FIG. 2, is engaged with the loading base 21 (FIG. 2), through engaging pieces 36 (FIG. 2). The left engaging pieces 26 of the arm base 23 and the left clamper arm 28 are movable both to the right (in the Y direction) and to the left (in the opposite direction), because pins provided for the left clamper arm 28 are engaged with elongated through-holes which are formed in the left side portion of the arm base 23 in such a manner that they are extended in the Y direction.

Therefore, the arm base 23, can be moved vertically with the arm base lifting mechanism 24 by swinging the left clamper arm 28 with the drive section (not shown). As shown in FIGS. 1 and 2, the arm base 23 at the upper position is moved downwardly according to the following sequence. The left clamper arm 28 is swung clockwise (as viewed from the front side of the disk player) about the axial pieces 27. The pins of the left engaging pieces 26 are swung while sliding along the elongated through-holes formed in the arm base 23, to move the arm base 23 downwardly. The front clamper arm 37 is swung counterclockwise (as viewed from the right side of the player) about the axial pieces 31 while the protrusions 35 of the front clamper arm 37 are being slid along the elongated through-holes 34 of the arm base 23. As a result of the foregoing, the arm base 23 is moved downwardly while being kept in parallel with the tray 6.

The player housing 1 accommodates a pickup unit (not shown) whose purpose is to pick up reproducing signals from one of the CDs 4 or the LD 5 when set at the reproducing position. The pickup unit is moved horizontally to read reproducing signals from the disk, when an instruction signal is applied to the pickup unit by operating the switches 14 of the disk player.

Figure 3:
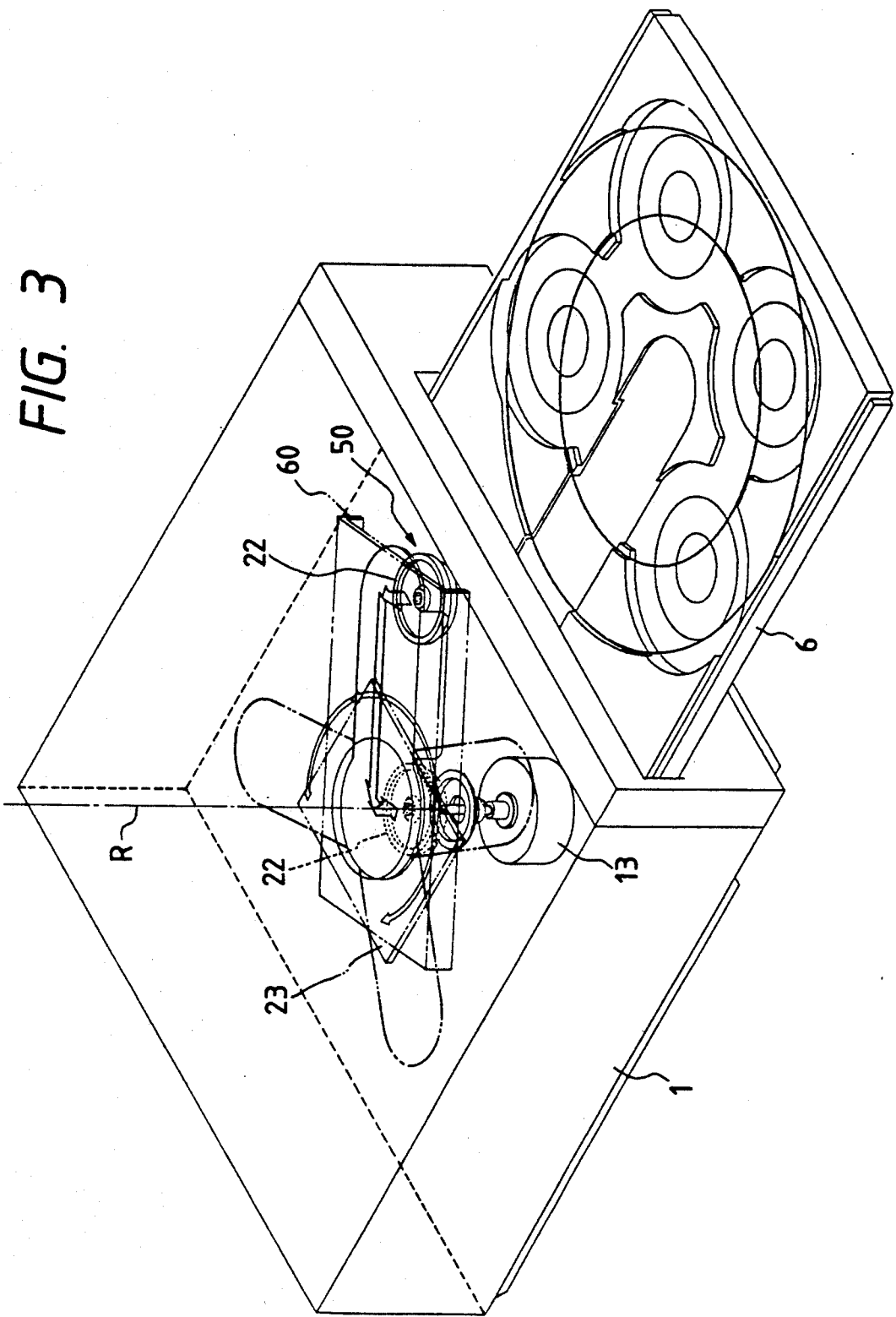
FIG. 3 is a perspective view of the operations of the swinging arm apparatus and a disk clamper in the disk player.
Figure 4:
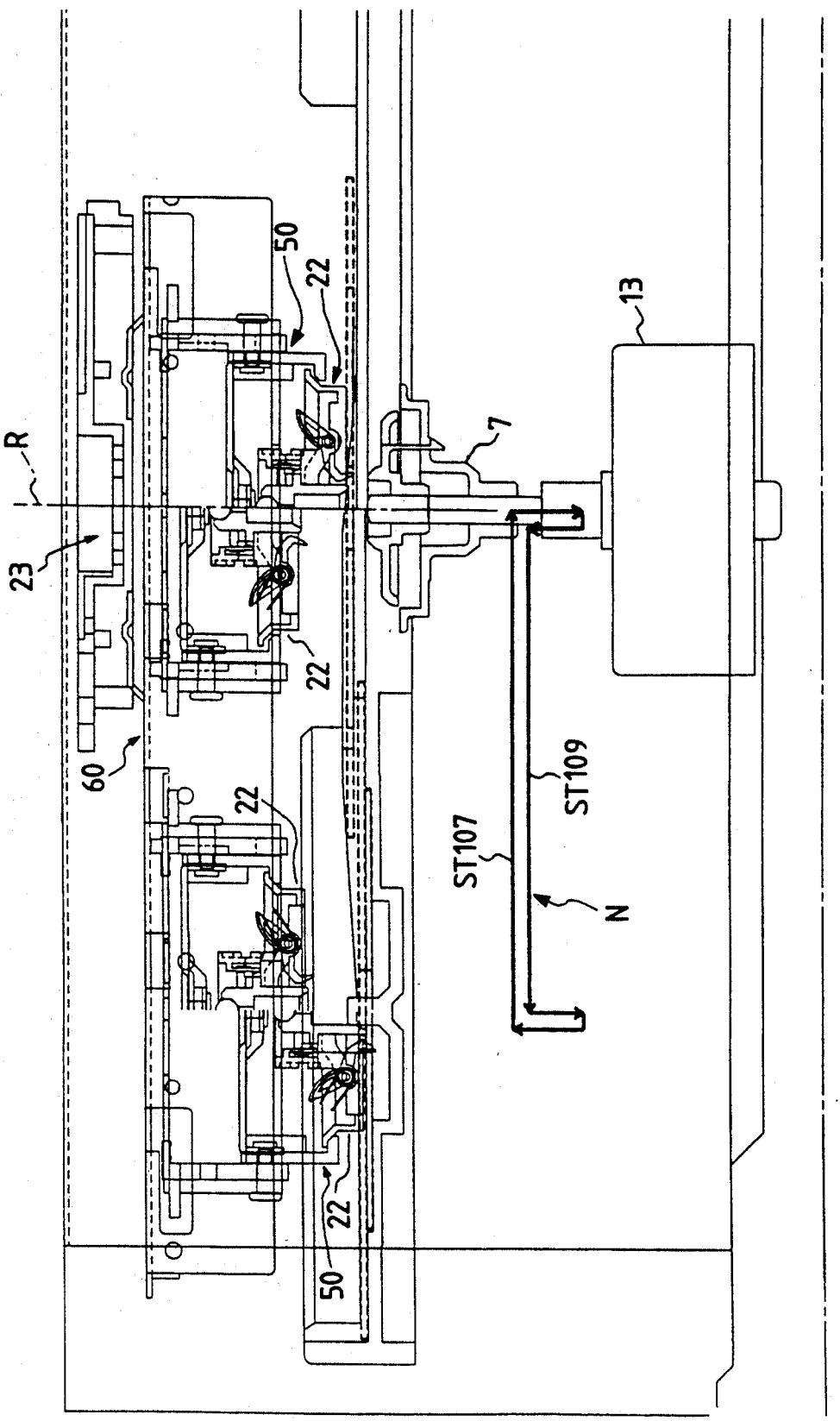
FIG. 4 is a side view of the operations of the carriage and the disk clamper in the disk player.

As shown in FIGS. 3 and 4, the disk player is constituted by: a disk holder, namely, a carriage 50 for detachably holding the first disk, or the CDs 4 (FIG. 1), on the tray 6; and, a swinging arm apparatus 60 which is swung about a disk playing position R, while supporting the carriage 50 in such a manner that the carriage 50 is reciprocated between any one of the disk receiving sections $E_1$ through $E_4$ of the tray 6 while retracted into the play housing 1 and in the disk playing position R. The second disk, LD 5 (FIG. 1), is set at the disk playing position R when selected for playing. The disk playing position R is at the center of the spindle motor 13 which is the same as the center of the turntable 7.

The swinging arm assembly 60, as shown in FIG. 4, is located below the arm base 23. The carriage 50, housing the above-described disk clamper 22, is provided for the swinging arm assembly 60 in such a manner that the carriage 50 is reciprocated along the swinging arm assembly 60.

Figure 5:
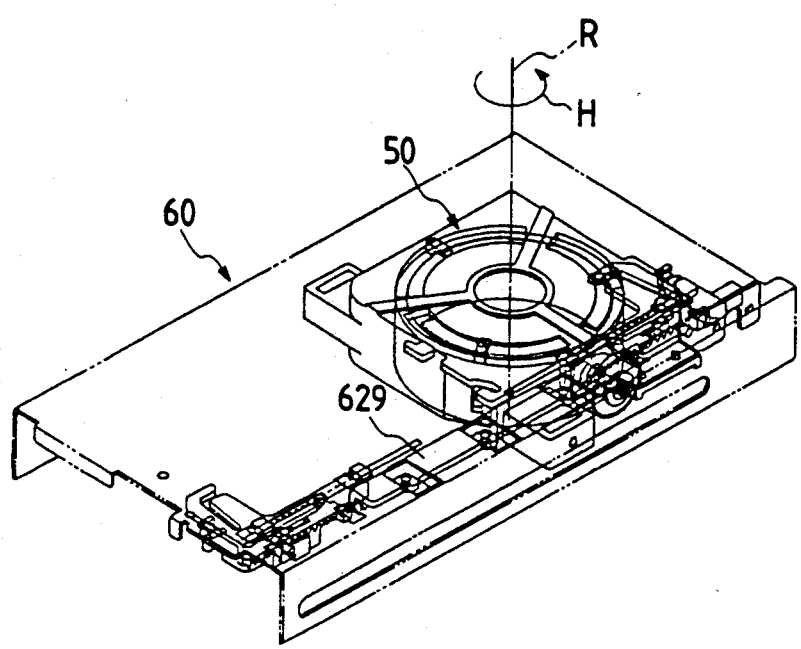
FIG. 5 is a perspective view of the operation of the carriage with respect to the swinging arm apparatus with the carriage at the disk playing position.
Figure 6:
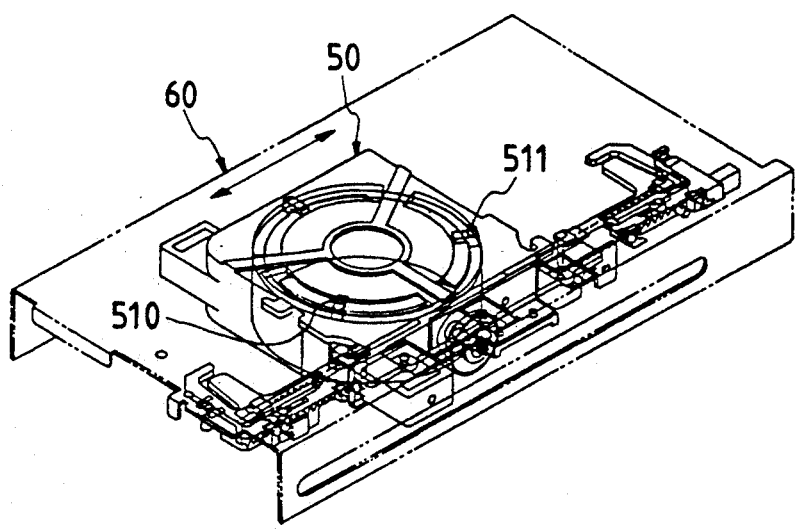
FIG. 6 is a perspective view of the carriage which is being moved between the disk playing position and a CD receiving position.
Figure 7:
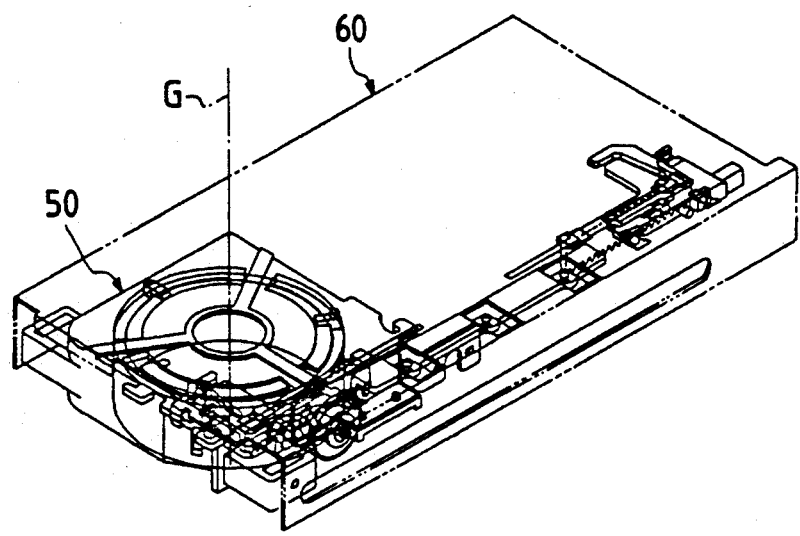
FIG. 7 is a perspective view of the carriage which has been moved to the disk receiving position.

FIG. 5 shows the carriage 50, with respect to the swinging arm apparatus 60, while positioned at the center of the spindle motor or at the disk playing position R. FIG. 6 shows the carriage 50 being moved from the disk playing position R to an outer peripheral position G (FIG. 7) which corresponds to a selected disk receiving section $E_1$ through $E_4$ where the CDs 4 are positioned. FIG. 7 shows the carriage 50 which has reached the outer peripheral position. The swinging arm apparatus 60 is rotatable about the playing position R as indicated by the arrow H in FIG. 5.

Figure 8:
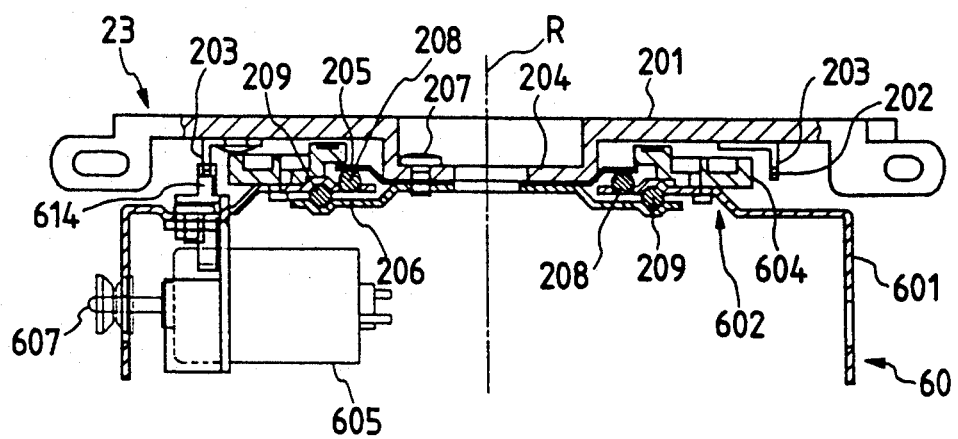
FIG. 8 is a sectional front view of the swinging arm apparatus.
Figure 9:
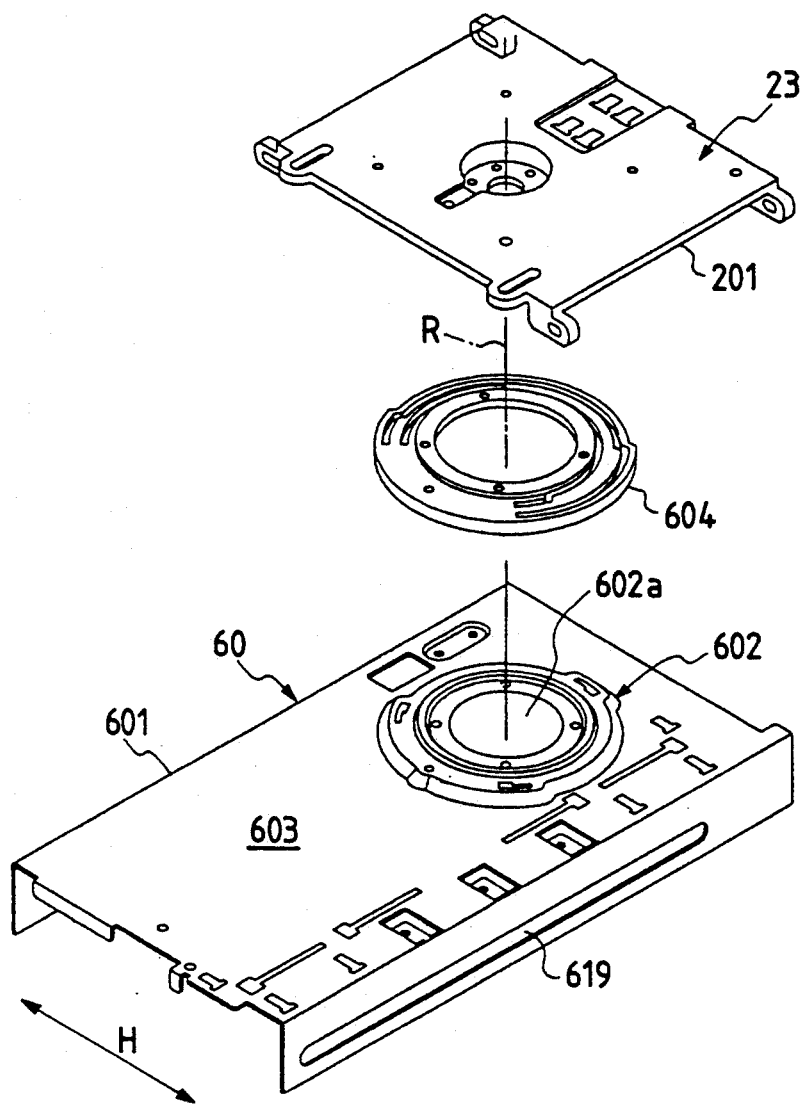
FIG. 9 is an exploded perspective view of the swinging arm apparatus.

FIG. 8 is sectional front view of the swinging arm apparatus 60. FIG. 9 is an exploded perspective view of the swinging arm apparatus 60. The swinging arm means 60, as shown in FIGS. 8 and 9, is mounted on the lower surface of the arm base 23 in manner that it to be rotated. The swinging arm apparatus 60 has a swinging arm body 601. An annular rack 203 is secured to the lower surface of an arm base body 201 in such a manner that its center is at the disk playing position. The annular rack 203 is L-shaped in section, and has gear teeth 202 formed in its lower edge portion. A support 204 extends downwardly from the central portion of the arm base body 201. An annular leaf spring 205 and an annular retainer 206 are secured to the lower surface of the support 204 with screws 207. A swinging supporting section 602 having an opening 602a at the center is formed in the upper surface 603 of the swinging arm body 601 in such a manner that it is circular and stepped like stairs and its center is at the disk playing position. The swinging supporting section 602 is rotated with steel balls 208 and 209 held between itself and the above-described leaf spring 205 and retainer 206. A switch cam 604, having predetermined sloped portions in its upper surface, is mounted on the upper surface of the swinging supporting section 602. The switch cam 604 is turned together with the swinging arm body 601 to turn on and off switches SW5 and SW6 (FIG. 23) described later, to detect the angular position of the swinging arm apparatus 60.

Figure 10:
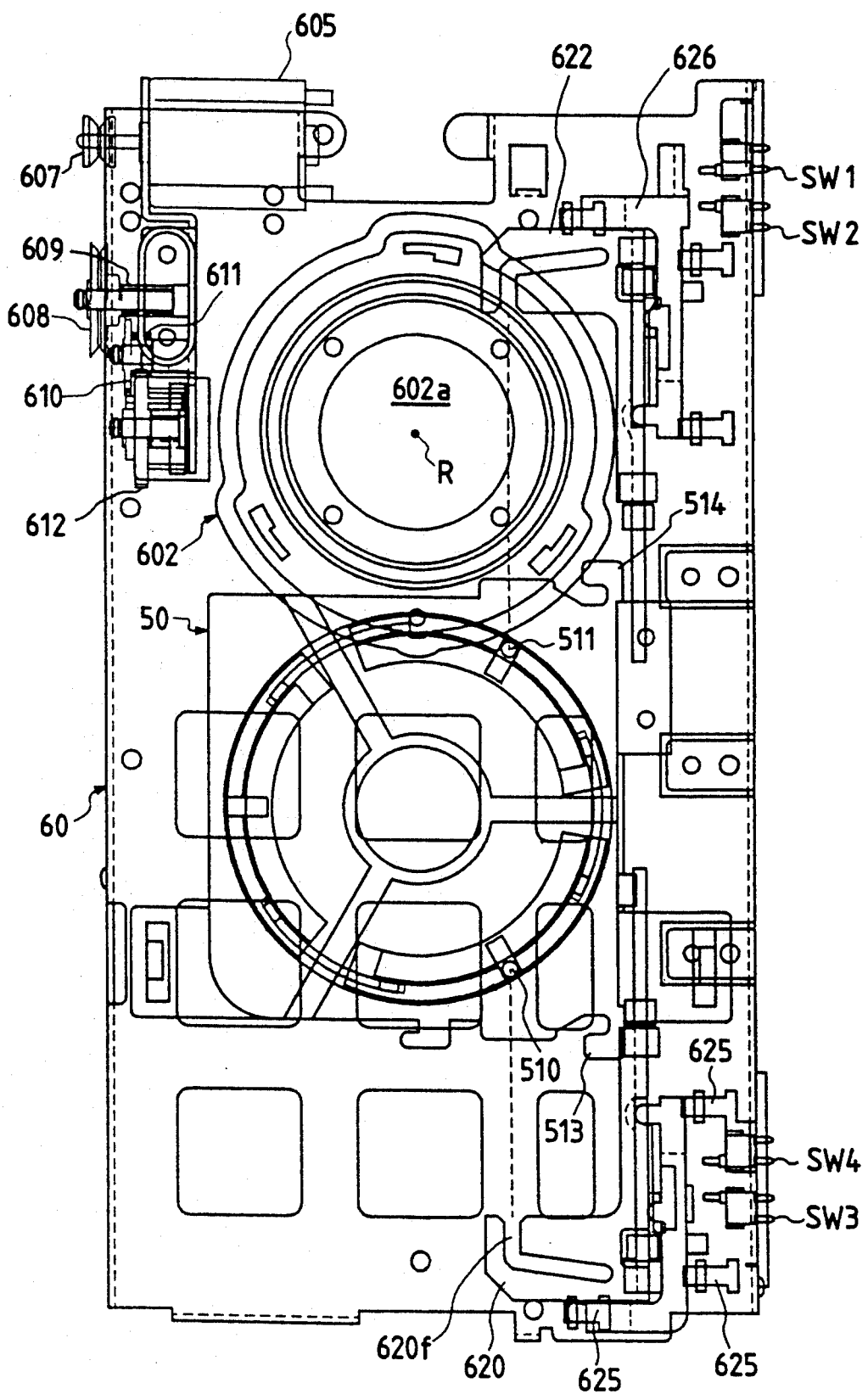
FIG. 10 is a plan view of the swinging arm apparatus and the carriage.
Figure 11:
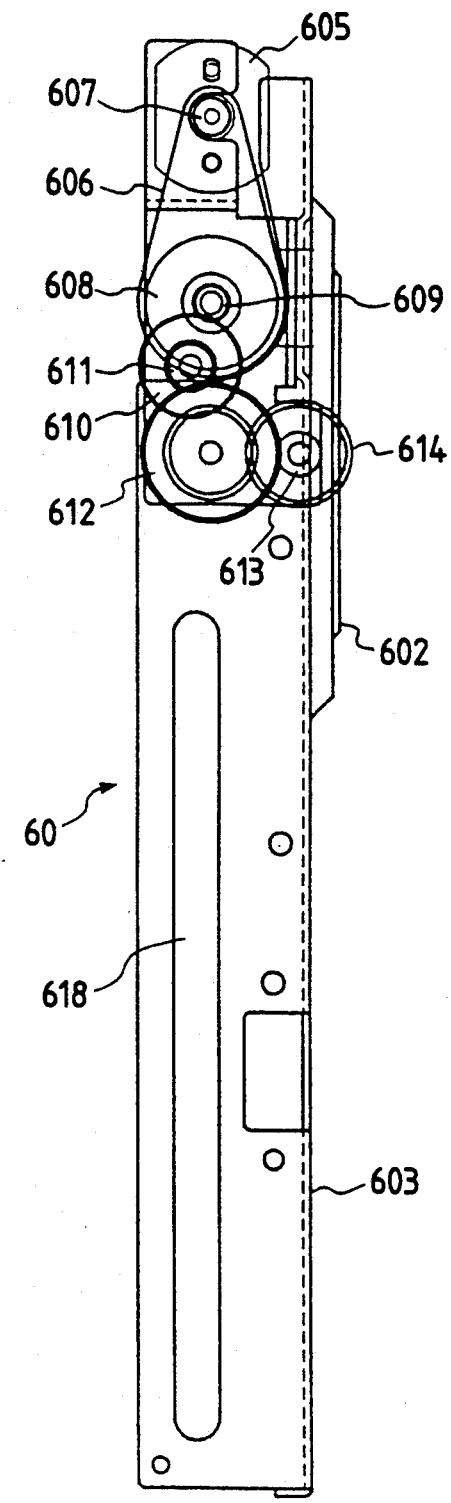
FIG. 11 is a side view of the swinging arm apparatus and the carriage.

As shown in FIGS. 8, 10 and 11, a drive motor 605 that rotates in both the forward and reverse directions, is mounted inside the swinging arm body 601. The rotation of the drive motor 605 is transmitted to an endless belt 606 laid over the output shaft 607 of the motor 605 and a pulley 608 rotatably mounted on the swing arm body 601. A gear 610, engaged with a gear 609, rotates together with the pulley 608. A gear 612, engaged with a gear 611, rotates together with the gear 610. A gear 613 is engaged with the gear 612. The foregoing gear structure enables rotational speed reduction in the stated order. The swinging gear 614, which is an integral part of gear 613, also is rotated, and is engaged with the above-described gear teeth 202 of the arm base 23. The swinging gear 614 is rotated, as the drive motor 605 rotates, so that the swinging arm body 601 is turned about the disk playing position R under the gear teeth 202 of the annular rack 203. The swinging arm body 601 with the drive motor 605 is turned (as indicated by the arrow H) about the disk playing position R with respect to the arm base body 201.

Figure 17:
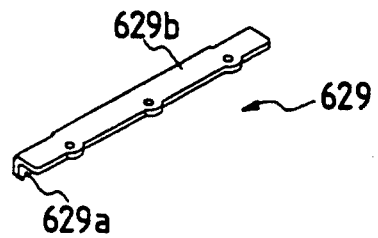
Figure 18:
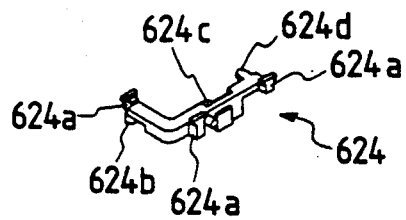
Figure 19:
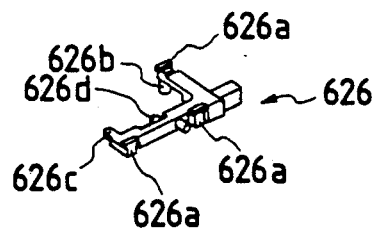

As shown in FIGS. 12-19, the swinging arm body 601 is a U-shaped device formed by bending a metal plate or the like. It has a rectangular top plate 615, a right side plate 617, and a left side plate 616. Elongated through-holes 618 (FIG. 11) and 619 (FIG. 12) are formed in the left side plate 616 and in the right side plate 617, respectively. The top plate 615 has longitudinal grooves 621 for guiding a front slide rack 620 (FIG. 15), longitudinal grooves 623 for guiding a rear slide rack 622 (FIG. 16), lateral grooves 625 for guiding a front change-over level 624, and lateral grooves 627 for guiding a read change-over lever 626 (FIG. 19). The top plate further includes three rectangular recesses 628 stepped downwardly from the upper surface 603.

As shown in FIG. 18, the front change-over lever 624 is an L-shaped device. The front change-over lever 624 has three T-shaped pieces 624a which are engaged with the three lateral grooves 625 (FIG. 12) of the swinging arm body 601, a downwardly extended pin 624b, and semi-circular protrusions 624c and 624d.

As shown in FIG. 19, the rear change-over lever 626 also is an L-shaped device. The rear change-over lever 626 has three T-shaped pieces 626a which are engaged with the three lateral grooves 627 (FIG. 12) of the swinging arm body 601 (FIG. 12) respectively, a downwardly extending pin 626b, and semi-circular protrusions 626c and 626d.

FIG. 17 shows a stationary rack 629 which is another L-shaped device. The stationary rack 629 has a rack portion 629a having teeth formed in the whole lower edge and a mounting portion 629b for mounting on the lower surfaces of the three recesses 628 of the swinging arm body 601 (FIG. 5).

Figure 15:
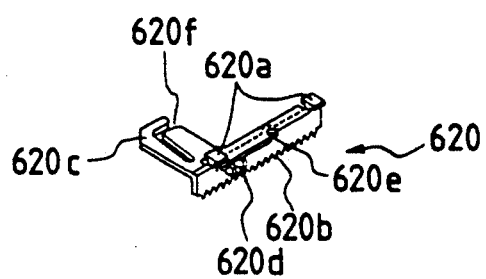

As shown in FIG. 15, the front slide rack 620 is constituted by: two T-shaped pieces 620a, which are engaged with the two longitudinal grooves 621 (FIG. 12) formed in the top plate 615 (FIG. 12) of the swinging arm body 601 (FIG. 12); a rack portion 620b; a cam portion 620c having a cam groove 620f; and semi-circular cuts 620d and 620e.

Figure 16:
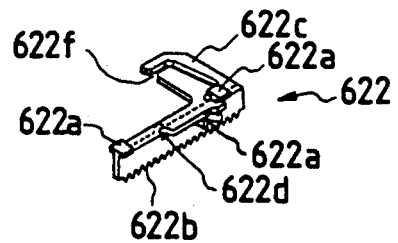

As shown in FIG. 16, the front slide rack 622 is constituted by: two T-shaped pieces 622a, which are engaged with the two longitudinal grooves 623 (FIG. 12) formed in the top plate 615 (FIG. 12) of the swinging arm body 601 (FIG. 12); a rack portion 622b; a cam portion 622c having a cam groove 622f; and semi-circular cuts 622d and 622e.

Figure 12:
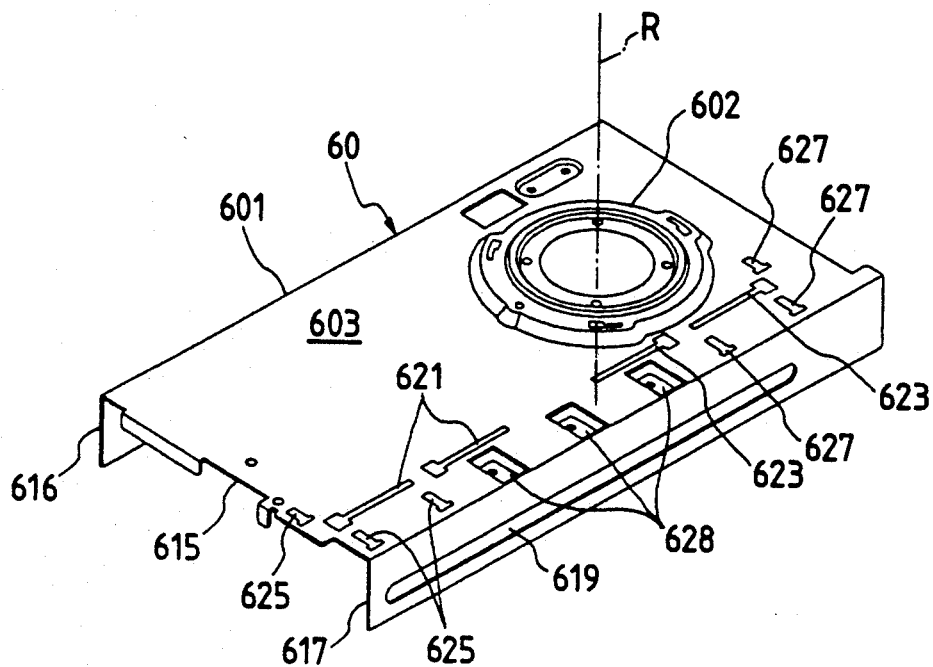
FIGS. 12 through 19 show the swinging arm apparatus and the carriage.
Figure 13:
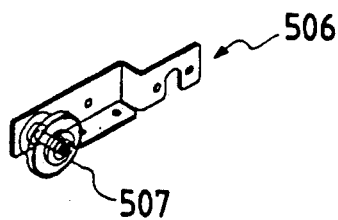

The carriage 50 has a carriage body 51 as shown in FIG. 14. The carriage body 51 is opened downwardly, and has mounting ears 502 and 501 at the right and left ends of its front end portion. The mounting ears 502 and 501 are coupled to right and left guide members (not shown), respectively. The right and left guide members are engaged with the elongated through-holes 619 (FIG. 12) and 618 (FIG. 11) formed in the right and left side plates 617 (FIG. 12) and 616 (FIG. 12), respectively, so that the carriage body 51 is moved back and forth with respect to the swinging arm body 601 (FIG. 12). Three arcuate holes are formed in the top plate 503 of the carriage body 51 in such a manner that they form a circle being arranged at equal angular intervals. The carriage body 51 has a mounting lug 505 at the right end of its rear end portion. A motor holder 506 (FIG. 13) is mounted on the mounting lug 505, and the motor (not shown) for moving the carriage 50 back and forth is mounted on the motor holder 506 (FIG. 13). The motor is adapted to rotate a gear 507 (FIG. 13) in the forward direction and in the reverse direction. The gear 507 (FIG. 13) is engaged with the rack portion 629a (FIG. 17) of the stationary rack 629 (FIG. 17) so that the carriage body 51 is moved back and forth with respect to the swinging arm body 601 (FIG. 12). A cylindrical outside cam 508 is provided inside the carriage body 51. Three L-shaped arms 509 are provided on the upper edge of the outside cam 508 at angular intervals of 120 degrees, and pins 510 and 511 are extended upwardly from two of the L-shaped arms 509. The outside cam 508 is fastened to the lower surface of the carrier body 51 by locking the L-shaped arms 509 to three locking portions 512 which are concentrically formed inside the arcuate holes 504 (FIG. 10). The pins 510 and 511 are fitted in the arcuate holes 504. The carriage body 51 has cam surfaces 513 and 514 formed in the right-handed portion at the right and left ends. The cam surfaces 513 and 514 are engaged with the pins 510 and 511 of the outside cam 508, respectively.

FIG. 6 depicts the carriage 50 located between the disk playing position R and the outer peripheral position G. In this position, the carriage 50 operates as follows. The carriage 50, while being guided by the elongated through-holes 618 (FIG. 11) and 619 (FIG. 12) of the swinging arm body 601 (FIG. 12) and while the gear 507 (FIG. 13) of the motor holder 506 (FIG. 13) is being rotated by the motor (not shown), is horizontally moved along the rack portion 629a (FIG. 17) of the stationary rack (FIG. 12). The pins 510 and 511 of the outside cams 508 (FIG. 14) are located as shown in FIGS. 6 and 10, while the carriage is being moved. The front slide rack 620 (FIG. 15) is held at the upper position because the two cuts 620d (FIG. 15) and 620e (FIG. 15) are engaged with the two semi-circular protrusions 624c (FIG. 18) and 624d (FIG. 18) of the front change-over lever 624 (FIG. 18), respectively. Similarly, the rear side rack 622 (FIG. 16) is held at the upper position because the two cuts 622d (FIG. 16) and 622e (FIG. 16) are engaged with the two semicircular protrusions 626c (FIG. 19) and 626d (FIG. 19) of the rear change-over lever 626 (FIG. 19).

FIG. 7 outlines the carriage 50 as it reaches the outer peripheral position G where the CDs 4 are located. In this position, the carriage 50 operates as follows. The gear 507 (FIG. 13) of the motor holder 506 (FIG. 13) is disengaged from the stationary rack 629 (FIG. 17), and engaged with the rack portion 620b (FIG. 15) of the front slide rack 620 (FIG. 20), before the carriage 50 reaches the outer peripheral position G. The pin 510 (FIG. 14) of the outside cam 508 (FIG. 14), which has been protruded upwardly through the arcuate through-hole 504 (FIG. 14) of the top plate 503 (FIG. 14) of the carriage body 51 (FIG. 14), is engaged with the cam groove 620f (FIG. 15) of the front slide rack 620 (FIG. 15). The pin 624b (FIG. 18) of the front change-over lever 624 (FIG. 18) is moved to the right by the front cam surface 513 (FIG. 14), and accordingly the two protrusions 624c (FIG. 18) and 624d (FIG. 18) of the front change-over lever 624 (FIG. 18) are disengaged from the two cuts 620d (FIG. 15) and 620e (FIG. 15) of the front slide rack 620 (FIG. 15), respectively, when the carriage 50 reaches the outer peripheral position G. The front slide rack 620 (FIG. 15) is released, so that it is moved backwardly by the gear 507 (FIG. 13) of the motor holder 506 (FIG. 13). The pin 510 (FIG. 14) of the outside cam 508 (FIG. 14), being engaged with the cam groove 620f (FIG. 15) of the cam portion 620c (FIG. 15), is turned counterclockwise as the front slide rack 620 (FIG. 15) is moved as described above. The operations which are carried out after the outside cam 508 (FIG. 14) has been turned in this manner will be described below.

FIG. 5 details the carriage 50 as it reaches the disk playing position R. In this position, the carriage operates as follows. The gear 507 (FIG. 13) of the motor holder 506 (FIG. 13) is disengaged from the stationary rack 629, and engaged with the rack portion 622b (FIG. 16) of the rear slide rack 622 (FIG. 16) before the carriage 50 reaches the disk playing position R. The pin 511 (FIG. 14) of the outside cam 508 (FIG. 14), which has been protruded upwardly through the arcuate through-hole 504 (FIG. 14) of the top plate 503 (FIG. 14) of the carriage body 51 (FIG. 14), is engaged with the cam groove 622f (FIG. 16) of the rear slide rack 622 (FIG. 16). The pin 626b (FIG. 19) of the rear change-over lever 626 (FIG. 19) is moved to the right by the rear cam surface 514 (FIG. 14), and accordingly the two protrusions 626c (FIG. 19) and 626d (FIG. 19) of the rear change-over lever 626 (FIG. 19) are disengaged from the two cuts 622d (FIG. 16) and 622e (FIG. 16) of the rear slide rack 622 (FIG. 16), respectively, when the carriage 50 reaches the disk playing position R. The rear slide rack 622 (FIG. 16) is released, so that it is moved forwardly by the gear 507 (FIG. 13) of the motor holder 506 (FIG. 13). The pin 511 (FIG. 14) of the outside cam 508 (FIG. 14), being engaged with the cam groove 622f (FIG. 16) of the cam portion 622c (FIG. 16), is turned clockwise as the rear slide rack 622 (FIG. 16) is moved in this way. The operations which are carried out after the outside cam 508 (FIG. 14) has been turned in this manner also will be described below.

Figure 20:
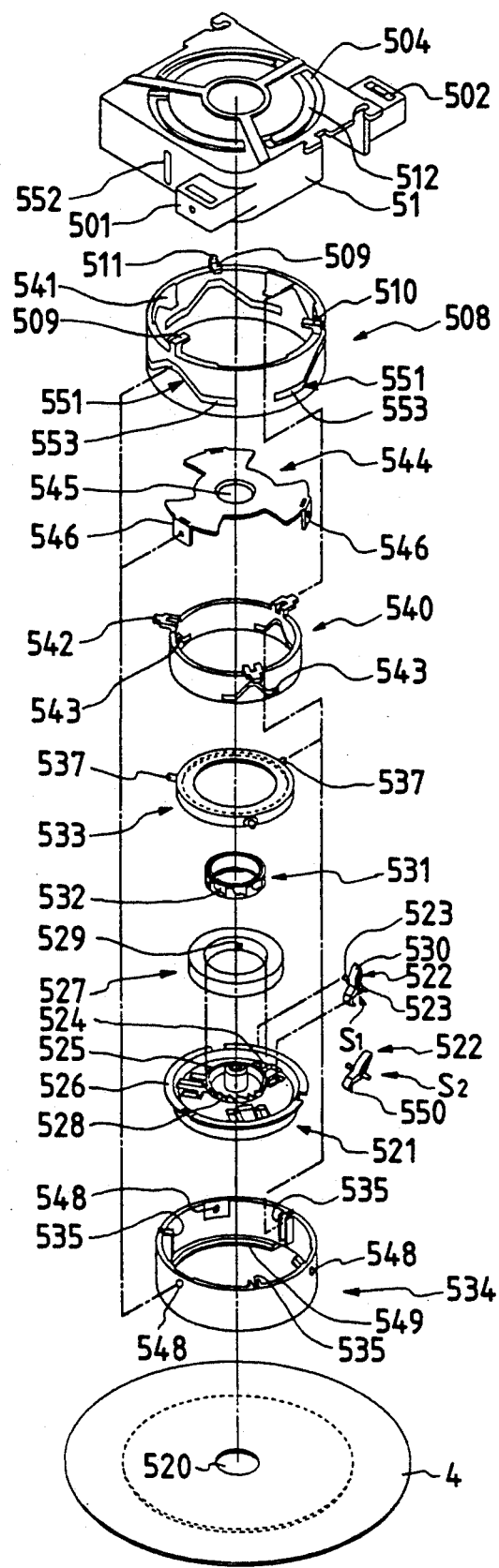
FIG. 20 is an exploded perspective view of the carriage.

The structure of the carriage 50 now will be described with reference to FIG. 20. The first disk, or the CD 4, has a center hole 520. The carriage 50 includes a disk clamper 521 for depressing the CD 4. The disk clamper 521 is constituted by: three pawl-shaped CD holders 522 which are detachably engaged with the center hole 520 of the CD 4, to hold CD 4; three recesses 524 which support the rotary shafts 523 of the CD holders 522 in rotatable fashion; a spherical portion 525 in which a steel ball or the like is press-fitted; three positioning flanges 526; and, a ratchet 528 whose teeth are arranged circular to move a slider 527 (described later) through a predetermined angle.

The slider 527 is annular, and has triangular protrusions 529 on its inner circumferential wall which are engaged with the ratchet of the disk clamper 521. The lower surface of the slider 527 is abutted against the curved surfaces 530 of the CD holders 522.

The carriage mechanism further includes a clamper head 531, which is an annular member. The clamper head 531 has a circularly arranged ratchet 532. The clamper head 531 is engaged with the disk clamper 521 and with the slider 527 set therebetween.

The carriage mechanism further includes a cam lever 533 which is also in the form of an annular member. Three pins 537 are outwardly extended in a radial direction from the cam lever 533, which are engaged both with three vertical grooves 535 formed in the inner wall of a clamper holder 534 and with three cam grooves 543 in the form of three inverted-V-shaped elongated through-holes which are cut in an inside cam 540. The lower surface of the cam lever 533 is abutted against the upper surface 538 of the slider 527.

The inside cam 540 includes three arms 54 engaged with three sloped portions 541, respectively, which are formed as cuts or recesses in the inner wall of the upper portion of the outside cam 508. The inside cam 540 further includes three cam grooves 543 which are in the form of three inverted-V-shaped elongated through-holes cut in the cylindrical wall.

The carriage mechanism further includes a clamper base 544 which is a substantially circular member made of a metal plate. The clamper base 544 has a bearing portion 545 at the center which is in the form of a recess. The lower surface of the bearing portion 545 is brought into contact with the spherical portion 525 of the disk clamper 521.

The clamper holder 534 includes the above-described three vertical grooves 535 for guiding the three pins 537 of the cam lever 533, three round guide through-holes which correspond to the female-threaded holes formed in the bent portions 546 of the clamper base 544, and three supporting portions 549 which support the flanges 526 of the disk clamper 521.

Each of the CD holders 522 of the disk clamper 521 has a curved surface 530 which is brought into contact with the lower surface of the slider 527, two rotary supports, namely, two coaxial rotary shafts 523, and a pawl 550 for holding the center hole of the CD 4 from inside. The CD holders 522 are arranged at three positions with their pawls 550 urged outwardly, as indicated at $S_1$ by torsion coil springs (not shown) laid between the disk clamper 521 and the CD holders 522.

The outside cam 508 has three cam grooves 551 in the form of inverted-V-shaped elongated through-holes which are formed in the cylindrical wall at equal angular intervals. The three cam grooves 551 are engaged with stepped screws (not shown) which are engaged with the female-threaded holes in the bent portions 546 of the clamper base 544.

Three vertical grooves 552 in the form of three vertical elongated through-holes are formed in the side wall of the carriage body 51 and correspond to the female-threaded holes of the bent portions 545 of the clamper base 544. The three vertical grooves 551 are engaged with the stepped screws of the clamper base 544.

The stepped screws of the clamper base 544 are moved downwardly by the cam grooves 551 of the outside cam 508, while being guided by the vertical grooves 552 of the carriage body 51, when the pins 510 and 511 of the outside cam 508 are extended upwardly through the arcuate holes 504 of the carriage body 51 and turned clockwise from their middle positions as was described above. The clamper base 544 with the stepped screws and the clamper holder 534 with the guide round holes 548 with which the stepped screws are engaged are moved downwardly, so that the disk clamper 521 supported by the clamper holder 534 is moved downwardly to the CD 4. The inside cam 540 is moved down the sloped portions 541 formed in the inner wall of the outside cam 508 in this operation.

The clamper section, including the clamper holder 534, is held at the above-described lower position by the horizontal portions 553 of the cam grooves 551 of the outside cam 508, when the pins 510 and 511 of the outside cam 508 are further turned clockwise. The inside cam 540 is turned with its arms 542 engaged with the ends of the sloped portions 541 formed in the inner wall of the outside cam 508.

The pins 537 of the cam lever 533 are downwardly moved being guided by the vertical grooves 535 of the clamper holder 534, as the inside cam 540 is turned in the above-described manner. The slide 527 is moved downwardly by the lower surface of the cam lever 533 and, therefore, the protrusions 529 extending from the inner wall of the slider 527 are turned counterclockwise through a predetermined angle by the sloped surfaces of the ratchet 528 of the disk clamper 521. The protrusions 529 of the slider 527 are held at a height different from the previous height on the ratchet 532 of the clamper head 531 by the torsion coil springs of the CD holders 522 even after the cam lever 533 is moved in an upward direction. This mechanism is similar to a so-called "knock mechanism" provided for ballpoint pens. The height of the slider 527 is changed sequentially, as the cam lever 533 is moved up and down, so that each of the CD holders 522 repeatedly takes different postures as indicated at $S_1$ and $S_2$. The CD holder's pawls 550, when held as indicated at $S_1$, hold the CD 4. The CD holder's pawls 550, when held as indicated at $S_2$, release the CD 4. The outside cam 508, when turned counterclockwise as in the operation of the swinging arm means 60, causes the inside cam 540 to turn and open and close the CD holders 522.

Figure 21:
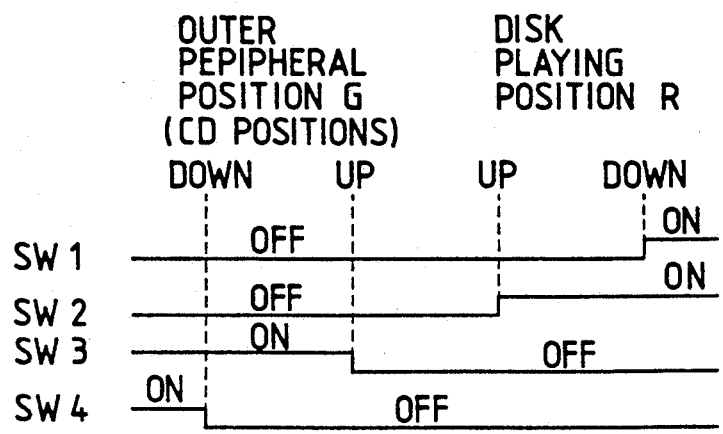
FIG. 21 is a diagram depicting the operations of switches SW1 through SW4 for detecting the position of the disk clamper.

FIG. 21 is a diagram showing the operation of switches SW1 through SW4 which detect the states of the disk clamper 22 (FIG. 3) which is moved horizontally and vertically together with the carriage 50 (FIG. 3). As shown in FIG. 10, the switches SW1 through SW4 are mounted on the right side plate of the swinging arm body 601 (FIG. 9). The switch SW1 is turned on only when the disk clamper 22 is moved down at the disk playing position R. The switch SW2 is turned on when the disk clamper 22 (FIG. 13) is moved to the disk playing position R and it is turned off when moved to the outer peripheral position G (FIG. 7) where the CD is located. The switch SW3 is turned on when the disk clamper 22 (FIG. 13) is at the outer peripheral position G (FIG. 7) and it is turned off when the disk clamper 22 (FIG. 13) is moved to the disk playing position R. The switch SW4 is turned on only when the disk clamper 22 (FIG. 13) is moved down at the outer peripheral position G (FIG. 7). Therefore, the horizontal and vertical positions of the disk clamper 22 (FIG. 13) can be detected with switches SW1 through SW4.

Figure 22:
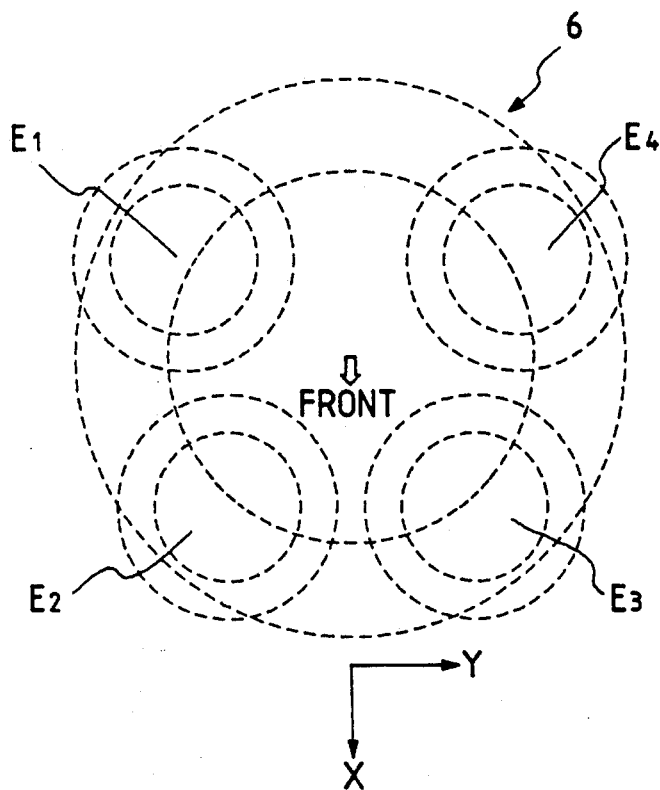
FIG. 22 is an explanatory diagram of the disk receiving positions on the tray.
Figure 23:
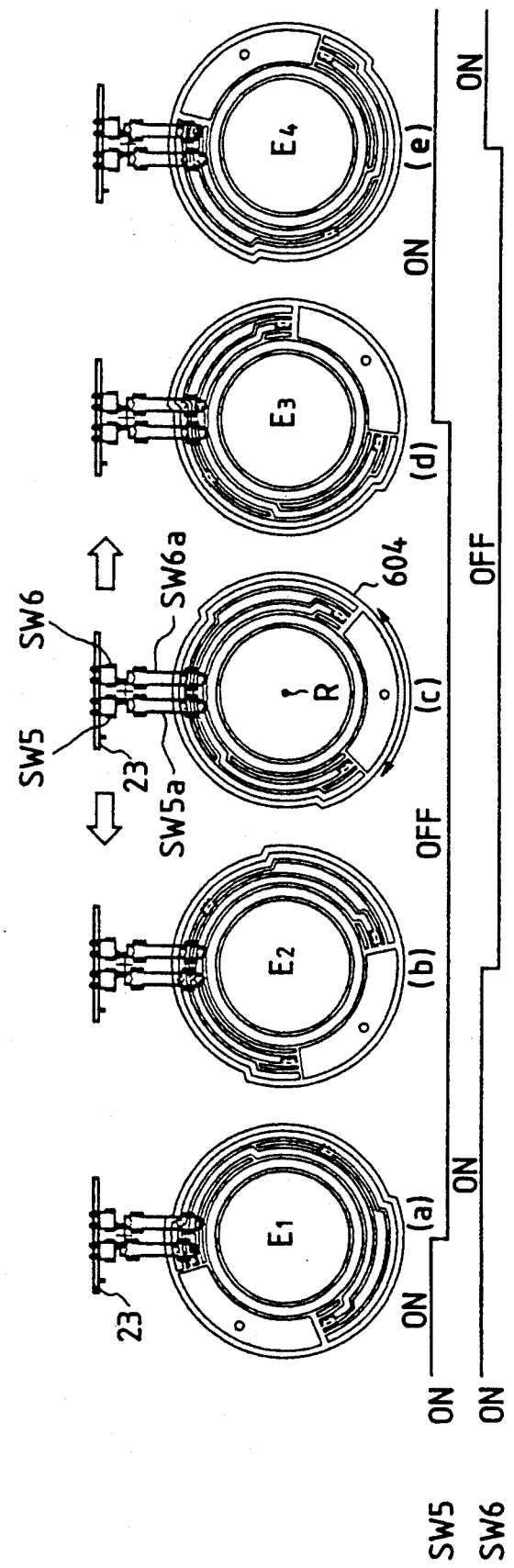
FIG. 23 is an explanatory diagram of the relationships between the switch cam of the swinging arm apparatus and switches SW5 and SW6.

FIGS. 22 and 23 are diagrams of the operation where a swing angle of the swinging arm apparatus 60 (FIG. 9) is detected with switches SW5 and SW6 to determine which of the disk receiving sections $E_1$ through $E_4$ (FIG. 2) which the disk clamper 22 points. The switches SW5 and SW6 are juxtaposed on the arm base 23 (FIG. 9). The switch levers SW5a and SW6a of the switches SW5 and SW6 are held in contact with the switch cam 604 (FIG. 9) at all times which is coupled to the swinging supporting section 602 (FIG. 9) of the swinging arm body 601 (FIG. 9). The switch levers SW5a and SW6a, described above, are swung to turn on and off the switches SW5 and SW6, thus providing four operation modes. The switch SW5 is turned off, while the SW6 is maintained turned on, in the case where the switch cam 604 is as indicated at (a) in FIG. 23 (i.e., when the swinging arm apparatus 60 is directed towards the disk receiving section $E_1$). The switch SW5 is turned off and the switch SW6 is turned off, in the case where the switch cam 640 is as indicated at (b) in FIG. 23 (i.e., the swinging arm apparatus 60 is directed towards the disk receiving section $E_2$). Both of the switches SW5 and SW6 are turned off, in the case where the switch cam is as indicated at (c) in FIG. 23 (i.e., the swinging arm apparatus 60 is directed forwards). The SW5 is turned on and the switch SW6 is turned off, in the case where the switch cam 604 is as indicated at (d) in FIG. 23 (i.e., the swinging arm apparatus 60 is directed towards the disk receiving section E₃). The switch SW5 is turned on and the switch SW6 is turned on, in the case where the switch cam is as indicated at (e) in FIG. 23 (i.e., the swinging arm apparatus 60 is directed towards the disk receiving section E₄). Thus, the angular positions of the swinging arm means 60 can be detected from the onoff states of the switches.

Figure 24:
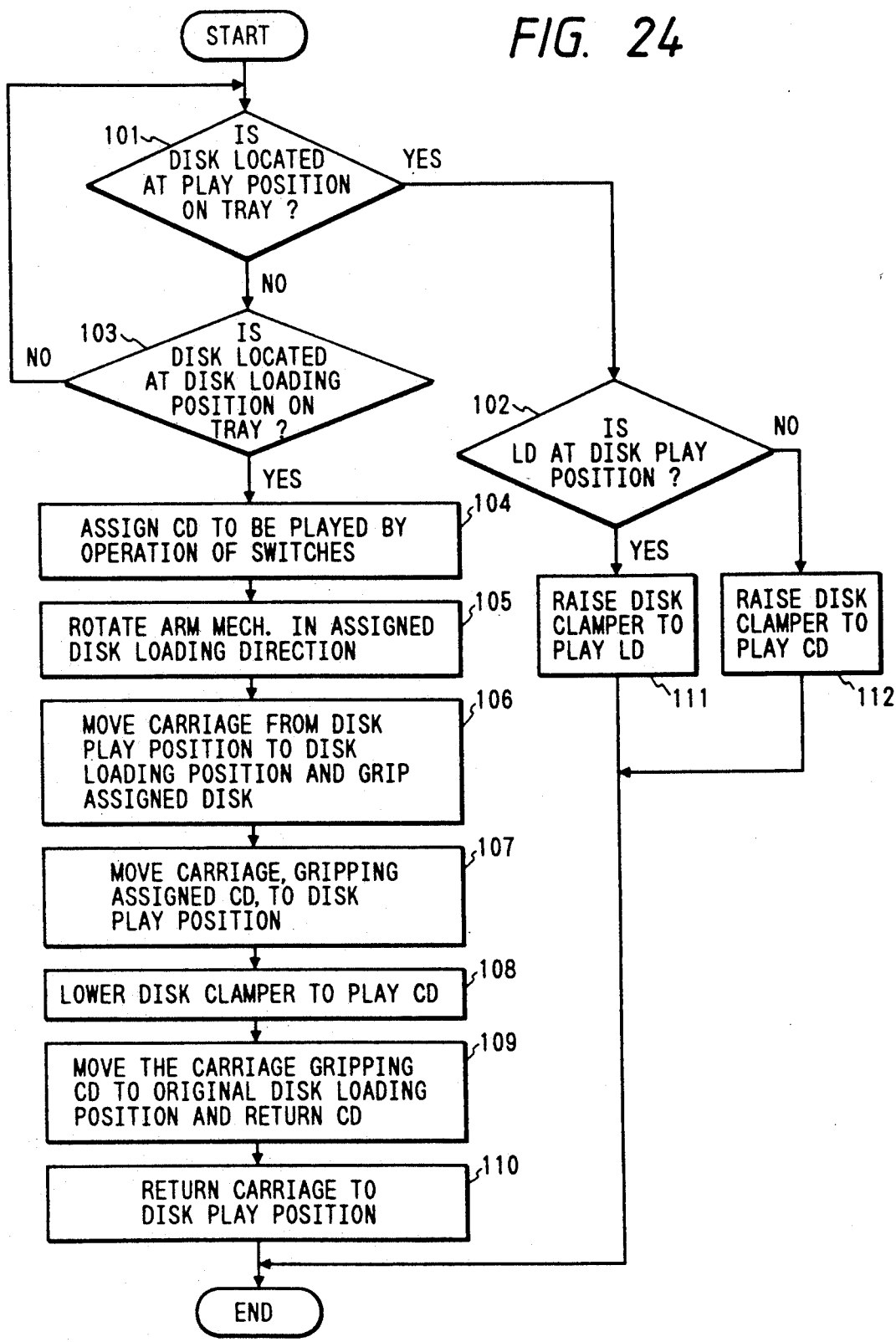
FIG. 24 is a flow chart of the operation of the disk player according to the invention.

FIG. 24 is a flow chart of the operation of the disk player according to the invention. Reference character N designates the movement of the CD 4 in association with the operation of the disk clamper 22. As shown in FIGS. 24 and 4, a discriminating device determines whether a disk, for instance an LD 5, is at the disk playing position R on the tray 6 (Step 101). If there is a disk, the discriminating device determines whether the disk is an LD 5 (Step 102). If the disk is an LD 5, the disk clamper 22, at the disk playing position R is moved upwardly, to play the LD 5 (111). If the disk is not an LD 5, the discriminating device determines that the disk at the disk playing position R is a CD 4. The disk clamper 22, in this instance, is moved upwardly to play the CD (Step 112). If the resultant demodulation signal is incorrect, it is determined that the disk is not normal and the playing of the disk in Steps 111 or 112 is suspended immediately. Where no disk is placed at the disk playing position R on the tray 6 (Step 101), the discriminating device determines whether a CD 4 is at any one of the disk receiving sections. Step 101 is effected again if no CD 4 is found. When CDs 4 are found (Step 103), Step 104 is effected. The CD 4 found, which is to be played, is specified by operating the switches 104 on the front panel 2 (Step 104). The swinging arm apparatus 60 is swung towards the disk receiving section where the specified disk is located (Step 105). Carriage 50 is moved along the swinging arm apparatus 60 from the disk playing position R to the disk receiving position to hold the specified CD (Step 106). Carriage 50, which holds the CD, is moved to the disk playing position R (Step 107) and the disk clamper 22 is moved downwardly to play the CD (Step 108). The disk clamper 22 holds the CD again and the carriage 50 is moved back to the disk receiving position to return the CD (Step 109), after the playing of the CD has been accomplished. Thereafter, the carriage 50 is returned to the disk playing position R (Step 110).

The discriminating device for determining whether an LD or CD is provided at the disk playing position R or at the disk receiving position may be an optical detector constituted by a light emitting element and a light receiving element which are arranged on both sides of a disk. The light emitted from the light emitting element is blocked by the disk, thereby determining whether an LD or CD has been provided, irrespective of whether a disk is set at the disk playing position R or at the disk receiving position, when a disk is interposed between the light emitting element and the light receiving element.

Both an LD 5 and CD 4 can be played with one spindle motor in the disk player of the invention. In addition, the LD 5 or CD 4 placed at the disk playing position R can be played with the CDs 4 set at the disk receiving position.

Four CDs 4 are laid on the tray in the abovedescribed embodiment; however, the invention is not limited thereto. The technical concept of the invention can be applied to the case where any number of CDs are placed on the tray.

In the inventive disk player, the swinging arm device swings about the disk playing position, and the disk holder is reciprocated along the swinging arm device. Hence, it is unnecessary to turn the tray on which disks are laid. Also, the second disk is laid over the first disks on the tray, and not only the first disk but also the second disk is played at the disk playing position. Hence, the number of disk driving motors can be reduced to only a single motor. An LD can be laid over CDs which have been placed on the tray, and can be played when in that arrangement.

While the invention has been described in detail above with reference to a preferred embodiment, various modifications within the scope of the invention will be apparent to those of working skill in this field.

What is claimed is:

1. A disk player for playing selectively one of a plurality of first disks and a second disk, said second disk having a larger diameter than each of said first disks, said disk player comprising:
   a player housing having a disk supplying opening formed therein;
   a tray operative to move back and forth through said disk supplying opening between an ejecting position outside of said player housing and an accommodating position inside said player housing, said tray having a plurality of disk receiving sections on which said plurality of first disks are laid in such a manner that the centers of said disk receiving sections are on the circumference of a circle having a center C, said tray further including at least one large diameter recess having a center which coincides with the center C and for receiving said second disk, said second disk being aligned with a disk playing position when said tray is in said accommodating position inside said player housing;
   disk holding means for detachably holding a selected one of said plurality of first disks; and
   swinging arm means, rotatable around said disk playing portion while supporting said disk holding means for reciprocating said disk holding means between any one of said disk receiving sections and said disk playing position, such that said tray remains stationary during operation of said swinging arm means.

2. The disk player as claimed in claim 1, wherein said first disks are compact disks and said second disk is a laser disk.

3. The disk player as claimed in claim 1, wherein said disk receiving sections on which said first disks are laid comprise small diameter recesses which are positioned below said large diameter recess for said second disk.

* * * * *